Dec. 26, 1944.  C. L. WILSON  2,365,986
DEVICE FOR CENTERING SHAFTS, DRILLS, OR THE LIKE
Filed Jan. 22, 1943
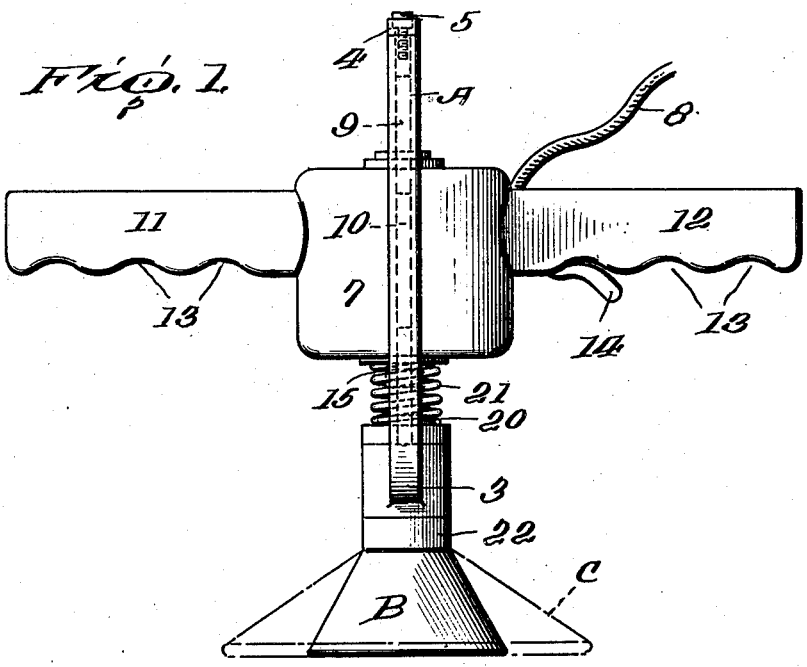
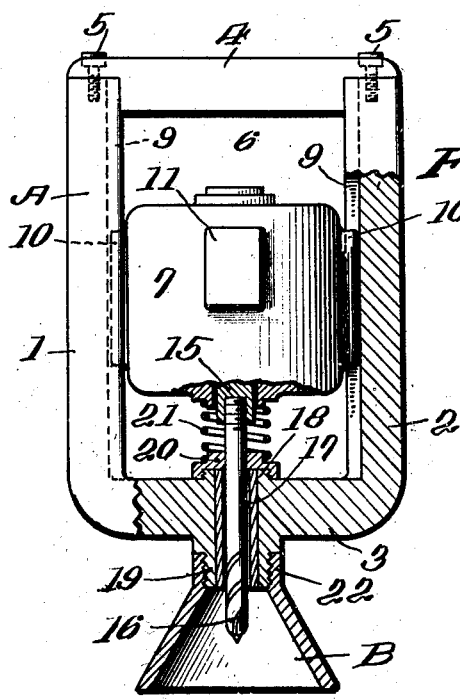
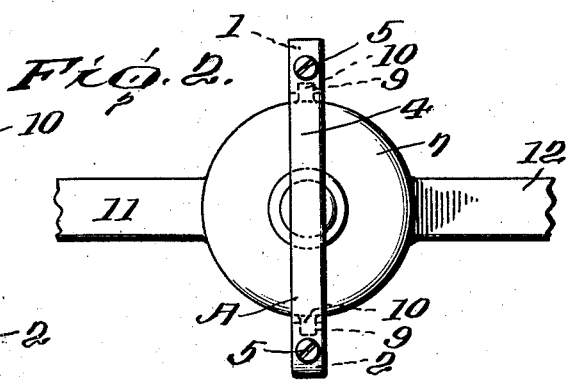
Inventor
C. L. Wilson
By Patterson, Wright & Patterson
Attorneys Patented Dec. 26, 1944

2,365,986

UNITED STATES PATENT OFFICE 2,365,986

DEVICE FOR CENTERING SHAFTS, DRILLS, OR THE LIKE

Crawford Lindsay Wilson, Beckley, W. Va.

Application January 22, 1943, Serial No. 473,239

3 Claims. (Cl. 77—18)

To enable work to be placed in a lathe to be operated upon by the lathe it is essential that the work be centered in the lathe, which requires that the longitudinal axis of the work be marked or countersunk in its ends. This is commonly referred to as "centering" and when done by hand requires the expenditure of a very considerable amount of time, with the result that this operation is costly. The work most commonly placed in lathes is shafts but other work is handled in lathes and it, like the shafts, must be pre-centered, and the present invention pertains to a device for centering shafts or other work which is to be placed in a lathe.

The primary object of the invention is to provide a portable and highly efficient tool or device for centering shafts or the like prior to their being placed in a lathe.

A further object of the invention is to provide a device for the purpose stated which is simple of construction and therefore cheap of manufacture yet is capable of rapidly and accurately marking or centering the work.

A still further object is to provide a device of the character described which is capable of handling or centering shafts or work pieces of variable dimensions.

Other objects, novel features of construction and improved results of the invention will appear from the following description and accompanying drawing.

In the drawing:

Fig. 1 is an edge view of the device.

Fig. 2 is a side view of the device, a portion of the view being broken away and shown in vertical section.

Fig. 3 is a rear end view of the device.

Describing the construction of the device in detail and its manner of operation, and utilizing similar reference numerals and characters to designate like parts, A designates in its entirety a rectangular and preferably metallic frame composed of spaced parallel side arms 1 and 2 joined at their front ends by a front bar 3 and at their rear ends by a rear bar 4 which is removably secured to the frame side arms by screw bolts 5 or other suitable like means.

The frame A is illustrated of rectangular form but it could be square if for any reason this were desirable and it frames an opening 6 within which is positioned a motor 7. This motor is illustrated as being an electric motor the current for which is brought from any suitable source of supply by a flexible current conducting cable 8. It will be understood that other motor or power means than an electric motor could be substituted without departing from the spirit of the invention.

On their inner opposed faces the side arms 1 and 2 of the frame are grooved throughout their length to provide parallel longitudinally extending guideways 9. The motor housing at opposite sides is provided with fins or lugs 10 of a size and configuration to fit within said guideways 9 so that the motor may be moved forwardly and rearwardly on the said arms of the frame within the space 6.

The rear end frame bar 4 retains the motor against longitudinal displacement and the removability of this bar permits the motor to be inserted or removed in the assembly of the device or for the purpose of repair or the substitution of a new motor should it prove necessary.

The motor as well as the frame and all that the frame carries are portable and are manually supported by means of a pair of handles 11 and 12 which extend outwardly from each side of the motor housing and extend outwardly well beyond each side of the frame. These handles at their under or forward sides are provided with a plurality of indentations 13 which are of a size and shape to conveniently receive the fingers of the hands of the operator of the device. The handle 12 adjacent one of the finger indentations is provided with a trigger 14 which operates an electric switch (not shown) of any conventional or well known type and provides a convenient means for permitting the operator of the device to start and stop the motor at will.

The motor is axially provided with a shaft 15 which at its forward end is provided with an internally threaded socket, or other suitable means, by which a drill 16 is secured to the motor shaft for rotation thereby.

This drill may be a twist drill or a taper drill, as desired, and is of a diameter to properly mark or indent the work so that the center marking made on the work by the drill will properly receive the lathe fitting upon which the work is to be axially rotatably supported.

The front bar 3 of the frame intermediate its length is thickened and provided with an opening or passageway within which is suitably secured a bearing 17. This opening or passageway at its inner and outer ends is provided with an externally threaded shoulder or hub designated, respectively, at 18 and 19. The inner threaded shoulder 18 threadedly receives a retaining cap 20 the outer face of which is shaped to receive the forward end of a coil spring 21 the rear end of which surrounds the motor shaft and bears against the forward end of the motor housing.

A conical or tapered bell B having an internally threaded circular flange portion 22 which is detachably threadedly connected to the externally threaded hub 19 and the construction and arrangement is such that the drill 16 when projected forwardly will extend exactly into the longitudinal center of the bell.

The bell is for the purpose of receiving one end of the shaft or work and for automatically centering the end of the work in respect to the drill or other center marker. As work of varying sizes and dimensions will come to hand for centering it will be necessary in respect to larger pieces of work to use a bell larger than that illustrated in full lines in the drawing and the provision of such a larger bell is contemplated as appears in dotted lines in Fig. 1 of the drawing where a substitute larger bell C is illustrated. This larger bell can be substituted by removal of the smaller bell and is threadedly attached to the frame in identical manner to that illustrated in respect to the smaller bell B.

The operation of the device is as follows:

The flexible current conducting cable 8 is made sufficiently long to permit the device to be moved about, which transportation is conveniently accomplished by the operator grasping the handles 11 and 12. In this manner the centering device is moved to the work to be marked or centered.

The coil spring 21 normally holds the motor and drill in a retracted position and the bell is placed against the end of the shaft or work and will automatically center the longitudinal axis of the work in respect to the drill or marker 16. The bell is held firmly against the end of the work and the operator then slides the motor forwardly on the frame against the tension of the coil spring 21. During this period or upon the engagement of the drill with the end of the work which is within the bell the operator actuates the trigger 14 to cause the motor to rotate the drill. The drill will thereupon mark or countersink the work on its exact center and rapid and efficient center marking or centering of the work is accordingly accomplished.

The device is extremely simple of construction and therefore can be manufactured and assembled at small cost. Notwithstanding the simplicity and cheapness of construction and assembly the device is sturdy and will withstand long and hard use without losing its accuracy or efficiency of performance. Additionally the feature providing for the substitution of bells of different sizes enables a wide use of the device. Replacement of parts and repair can be quickly and conveniently accomplished and the handle and motor control arrangement enables the operator to have both hands available for movement and manipulation of the device which enables rapid, efficient and accurate operation.

Departures from the specific arrangement and construction described and illustrated can be made without departure from the inventive concept, and the invention is to be limited only within the scope of the hereinafter appended claims.

I claim:

1. A portable centering device comprising, a plurality of side and end pieces forming a rectangular open frame the front end piece of which is provided with an opening, a motor mounted in said frame and having sliding interlocking connection with the side pieces thereof for guiding said motor as the same is moved toward and away from the front end of the frame, a work marking tool detachably connected to and carried by said motor and rotatable thereby, a bell connected to and supported on the front end piece of the frame and extending forwardly and outwardly therefrom, said bell having a conical shaped interior the inner end of which is in communication with said frame front piece opening, and said tool upon forward movement of said motor adapted to move through said frame front piece opening and extend into the diametric center of said bell interior, a handle mounted at each of two opposite sides of said motor and serving as means by which the entire centering device may be supported and the bell caused to telescopically receive and engage an end of the work to be centered, said handles further serving as means for pressing said bell firmly against the end of the work to center said work end with the marking tool and moving the motor forwardly until the said marking tool engages the work end within the bell, and means conveniently located for operation by the operator of the device for starting and stopping the motor.

2. A construction as defined in claim 1 wherein, the front frame piece at its exterior side is provided with an exteriorly threaded shoulder surrounding the opening in said piece, the inner reduced end of said bell being interiorly threaded and being of a diameter for threaded connection with said threaded shoulder to provide a quick detachable connection and detachment of bells of different sizes.

3. A construction such as defined in claim 1 wherein, resilient means is provided which normally holds said motor against movement, said resilient means permitting the bell to be pressed firmly against the end of the work without causing any movement of the motor and its marking tool toward the work.

CRAWFORD LINDSAY WILSON.